Jan. 24, 1961 D. J. WALSH 2,969,296

THERMAL EXPANSION FIXTURE FOR SPACING VAPORIZED CONTACTS ON SEMICONDUCTOR DEVICES

Filed Dec. 8, 1958 3 Sheets-Sheet 1

INVENTOR
D. J. WALSH
BY John C. Morris
ATTORNEY

Jan. 24, 1961 D. J. WALSH 2,969,296

THERMAL EXPANSION FIXTURE FOR SPACING VAPORIZED CONTACTS ON SEMICONDUCTOR DEVICES

Filed Dec. 8, 1958 3 Sheets-Sheet 2

INVENTOR
D. J. WALSH
BY John C. Moris
ATTORNEY

Jan. 24, 1961 D. J. WALSH 2,969,296

THERMAL EXPANSION FIXTURE FOR SPACING VAPORIZED CONTACTS ON SEMICONDUCTOR DEVICES

Filed Dec. 8, 1958 3 Sheets-Sheet 3

INVENTOR
D. J. WALSH
BY John C Morris
ATTORNEY

United States Patent Office 2,969,296
Patented Jan. 24, 1961

2,969,296

THERMAL EXPANSION FIXTURE FOR SPACING VAPORIZED CONTACTS ON SEMICONDUCTOR DEVICES

David J. Walsh, Chatham Township, Morris County, N.J., assignor to Bell Telephone Laboratories, Incorporated, New York, N.Y., a corporation of New York Filed Dec. 8, 1958, Ser. No. 778,836

2 Claims. (Cl. 117—200)

This invention relates to a method of and apparatus for manufacturing semiconductor devices and more particularly to a method of and apparatus for placing contacts on semiconductor materials.

The fabrication of a plurality of semiconductor devices from a slab of semiconductor material is disclosed in the Bell System Technical Journal for January 1956, pages 24 through 26. Briefly, the slab or specimen is placed in thermal evaporation apparatus and a film of contact metal, for example aluminum, deposited onto the surface of the slab through a mask which has a plurality of 1 x 2 mil apertures therein. Each aluminum strip deposited on the slab represents an emitter contact for a transistor after alloying the contacts to the slab. A base contact of gold, for example, is placed parallel to and 0.5 to 10 mil away from each contact after properly positioning the mask and evaporating the gold. Then, using a diamond saw, the slab is cut into a plurality of transistor devices, the collector contact of each device being soldered thereto after the cutting.

From a mass production and quality control standpoint, the adjustment of the mask between emitter and base evaporation is undesirable. First, in the processing of a large number of slabs the adjustment, which is of the order of tenths of mils, must be extremely accurate and identical for each slab for uniformity of electrical characteristics in the devices. Next, the adjustment requires the breaking of the vacuum existing in the thermal evaporation apparatus with subsequent danger of product contamination, and loss of time on the assembly line.

It has been found in vaporizing contact metal on a slab of semiconductor material that the metal will better adhere or stick to the slab if the slab is heated to a preselected temperature. For aluminum and gold contacts, the sticking or wetting temperatures of the slab are considerably different and the temperature change may be advantageously employed by a fixture having various metals of different thermal expansion coefficients to space the vaporized contacts on the slab.

A general object of the invention is an improved method of and apparatus for manufacturing a plurality of semiconductor devices.

One object of the invention is to space automatically and accurately a plurality of juxtaposed contacts on semiconductor material.

Another object of the invention is to space identically a plurality of sets of contacts on slabs of semiconductor materials being processed on an assembly line into a plurality of semiconductor devices.

A specific object of the invention is the rapid spacing of a plurality of sets of contacts on semiconductor material without danger of contaminating the material during the spacing.

According to one feature of the invention, semiconductor material held in a fixture is heated to preselected temperatures, the material being automatically positioned in the fixture for the placement of a plurality of vaporized contact sets in juxtaposed relation.

According to another feature of the invention a fixture for holding semiconductor material includes a mask which moves relative to the material as a function of temperature change to control the location of contact metals evaporated on the material.

According to still another feature of the invention a fixture includes members of different thermal expansion coefficients whereby successive vapor depositions of different contact metals at different temperatures is accompanied by relative positional differences of the members.

In an illustrative embodiment of the present invention, a thermal expansion fixture includes heating means, a base plate having a thermal coefficient of expansion $\alpha_1$, the base plate including a plurality of apertures therein, and a thermocouple device. A semiconductor specimen is centered over the base plate apertures by suitable means. An apertured mask having a thermal expansion coefficient $\alpha_2$ is positioned on top of the specimen. A clamp member holds the fixture and specimen together within a vacuum chamber which includes a plurality of vaporization sources for depositing contact metal through the base plate and masking apertures. One set of contacts is deposited on the specimen after the heating element raises the temperature of the fixture to a first preselected temperature. Thereafter, the fixture is changed to a second preselected temperature for deposition of the second set of contacts, the various metals of the fixture causing relative movement between the specimen and the mask to enable the second set of contacts to be deposited adjacent to the first set.

These and other objects of the features will be apprehended more fully from the following detailed specification when taken in conjunction with the appended drawing in which.

Figure 1:
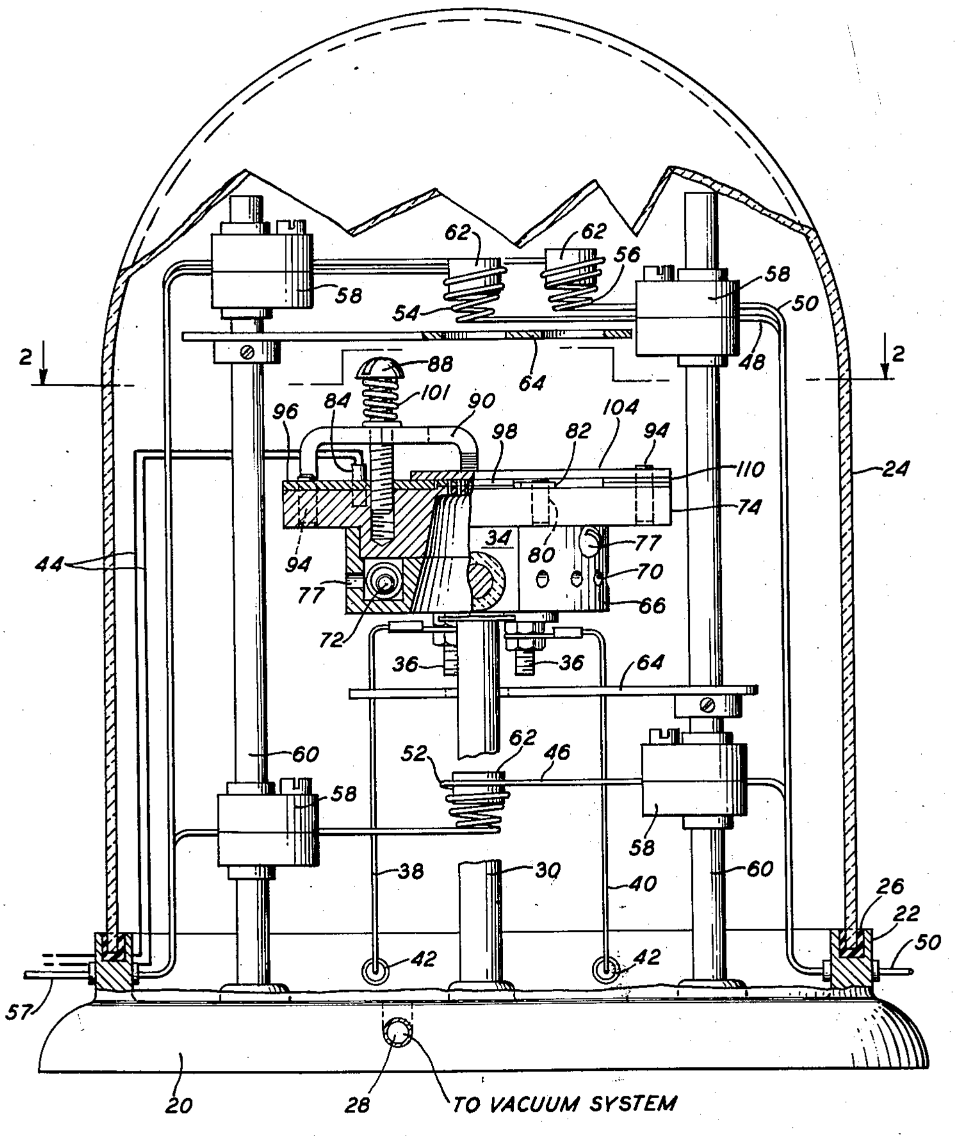
Fig. 1 is an elevational view, partly in section, of apparatus constructed in accordance with the present invention.

Referring to Fig. 1, the apparatus includes a base 20 having a grooved rim 22 for supporting a bell jar 24, the interior of the jar being sealed from the outside atmosphere by a gasket 26 which may be of any suitable material, for example, rubber. The interior of the jar is placed under a vacuum through a vacuum connection 28 to any conventional vacuum system (not shown).

Figure 2:
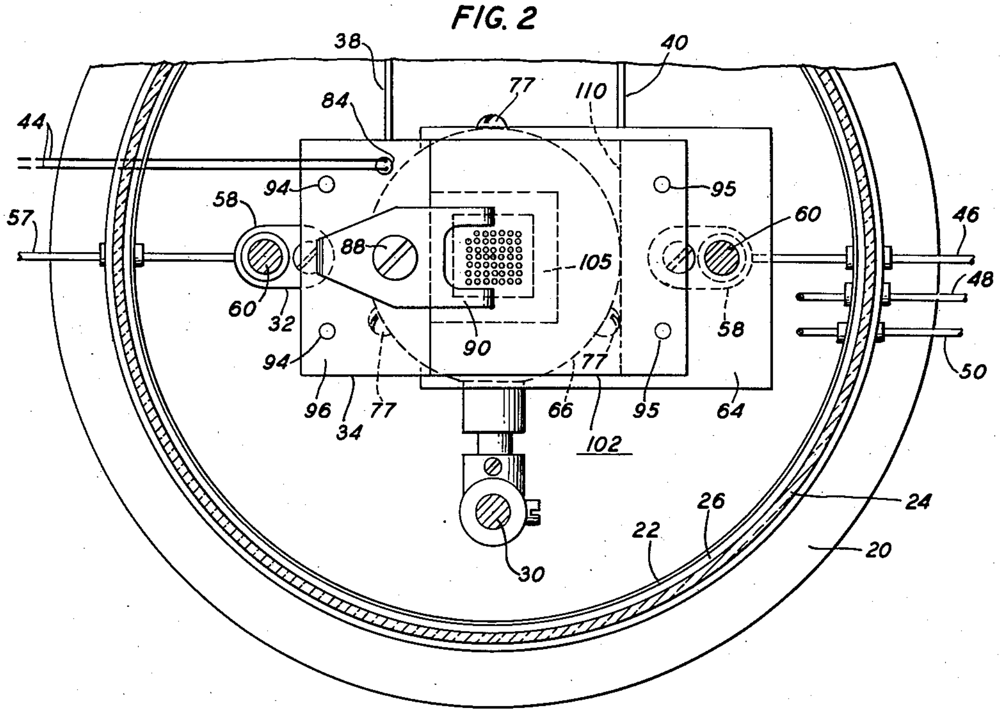
Fig. 2 is a partial cross-sectional view of Fig. 1 along the line 2—2.

Supported within the jar by the rod 30 (shown partially broken away) and the arm 32 (see Fig. 2) is a fixture 34 to be described hereinafter. A supply (not shown) of electric current of suitable frequency is connected through conductors 38 and 40 to terminals 36 attached to the fixture 34, the conductors passing through openings 42 in the rim 22, which include suitable sealing means therein. Also connected to the fixture are leads 44 which are part of a thermocouple circuit for measuring the temperature of the fixture.

Extending through the rim 22 are electric supply conductors 46, 48, and 50 (see Fig. 2), each conductor being connected to one of identical tungsten heating elements 52, 54, and 56, respectively. The heating elements are all connected to ground through the common line 57. The conductors 46, 48, and 50 are each supported by one of the ceramic insulators 58 attached to the support rods 60, each rod being imbedded in the base member 20 in an upright position. A cylinder or charge of metal 62, for example, aluminum or gold, is positioned in the center of each heating element and in alignment with the center of the fixture 34. The charge is vaporized by energization of the heating elements in accordance with well-known principles, the vaporized metal being radiated toward the fixture. An apertured shield 64 is placed between each heating element and the fixture to deflect the heat of the element away from the fixture.

The fixture 34 shown in detail in Fig. 3 will be designated a thermal expansion fixture for reasons which will become more apparent hereinafter. The thermal expansion fixture comprises a body 66, a collector mask and base plate assembly 74 of stainless steel, for example, the member 74 having suitable speciment or slab clamping means, an emitter-base mask assembly 102 of molybdenum, for example, a spacer assembly 106, and a masking clamp 90.

The body 66 is cylindrical in shape with a central opening 68 for the admission of vaporized metal into the fixture (also see Fig. 1). A plurality of holes 70 in the body permits the escape of excess vapor therein. A heater coil 72 is positioned in the body and surrounds the opening 68, the coil being connected to the terminals 36 (also see Fig. 1).

The collector mask and base plate assembly 74 includes a cylindrically shaped shoulder portion 76 and connects to the body 66, the shoulder having tapped holes 79 therein to receive fasteners 77 which hold together the body and the member 74. In the center of the member 74 is the collector mask portion, the apertures 78 thereof being positioned directly over the opening 68. A temperature sensing device 84, such as a thermocouple, is mounted in the member 74 and connects to the leads 44 which in turn extend outside the jar to an indicating device (not shown). The slab or specimen clamping means of the member 74 include a stop plate 96 and a biasing spring 82, a specimen or slab 98 of semiconductor material being positioned therebetween (see Fig. 1). The stop plate is fixed at the outer end thereof by pins 94 which extend through the plate and into tapped holes 92 located in the member 74. The biasing spring 82 is anchored to pins 80 which are attached to the member 74.

Figure 3:
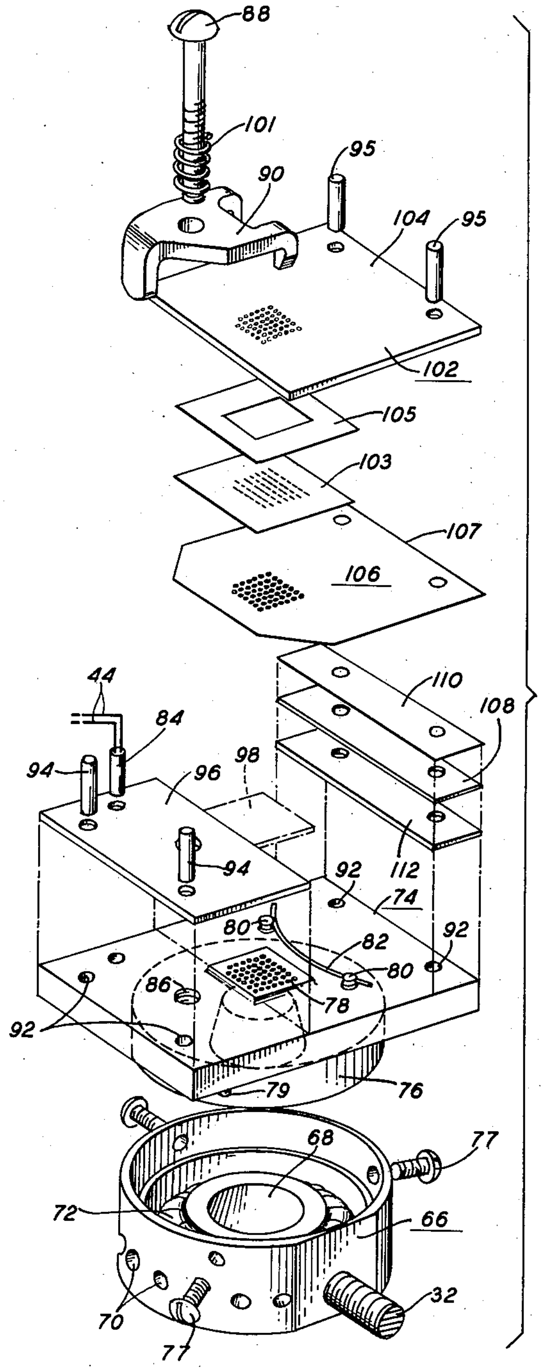
Fig. 3 is an exploded view of a fixture included in the apparatus of Fig. 1.

The mask assembly 102 and the spacer assembly 106 are each shown separated in Fig. 3. The mask assembly comprises a molybdenum sheet 103 of 0.0005 inch thickness with 48 rectangular apertures of 0.001 x 0.004 inch dimensions on 0.030 inch centers. The thin sheet of molybdenum is spot welded to a molybdenum support plate 104 having the same arrangement of apertures therein as the sheet 103. A sheet 105 of 0.001 inch thick platinum inserted between the plate and the sheet 103 aids in the spot welding. The spacer assembly 106 comprises a sheet 107 of molybdenum having the same arrangement of apertures therein as in the mask 102, an end section 108 spot welded to the spacer for stiffening purposes, and a section 110 of platinum between the section 108 and the sheet 107 to aid in the spot welding. The mask and spacer assemblies are fixed at their ends by pins 95 which extend therethrough and into tapped holes 92 located in the member 74. The assemblies cover the slab or specimen, the spacer assembly supporting the mask assembly above the slab to prevent the mask from buckling and scraping the slab during movement. Other end sections 112 may be placed between the spacer and the member 74 according to the height of the specimen.

Completing the fixture is the masking clamp 90 including a bolt 88 which is biased by a helical spring 101. The bolt threads into tapped hole 86 included in the member 74.

In the manufacture of diffused type transistors, the emitter contact is usually of aluminum whereas the base and collector contacts are of gold. The present invention permits a plurality of contacts with lateral dimensions of 0.0013 x 0.004 inch and a thickness of 50,000 Angstroms to be deposited on a specimen, the contacts being separated by about 0.0005 inch. The specimen or slab after deposition of the contact metal represents a plurality of transistor devices which may be diced into the several units.

Before the vaporization of contacts, the specimen is cleaned to remove any foreign material on the surface thereof. Thereafter the specimen of a semiconductor material, for example, silicon, is placed between the mask and the base plate, the apertures of both being in alignment. It can be seen from Fig. 1 that the lateral movement of the specimen is restrained by the biasing spring 82 and the stop plate 96. The clamping device prevents any vertical movement of the specimen 98. Next, the bell jaw is evacuated to a pressure of approximately $5\times10^{-6}$ mm. Hg by the vacuum system. The heater coil 72 is energized and regulated through the thermocouple device to a preselected temperature which improves the sticking or wetting of the contact metal on the specimen. For aluminum this has been found to be approximately 500 degrees centigrade whereas for gold it has been found to be approximately 300 degrees centigrade.

After the wetting temperature of aluminum is reached, the emitter contacts are vaporized on the specimen by energizing the heating element 54 in this case associated with an aluminum charge, the current being of a magnitude which may be determined from any well-known handbook, for example, "Vacuum Deposition of Thin Films," by L. Holland, John Wiley, 1956. The charge vapors pass through the apertures of the mask and on to the specimen. The thickness of the contacts deposited is determined by the time interval that the heating element is energized and/or the amount of charge. For aluminum thicknesses of 50,000 Angstroms, heating current of 150 amperes at 20 volts, and charge weight of 480 milligrams, this interval is usually of the order of four minutes.

Figure 4:
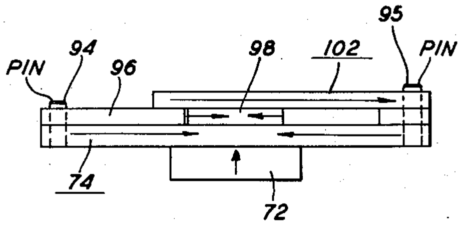
Fig. 4 is a schematic view of the fixture of Fig. 3.

To place gold base contacts of 15,000 Angstroms on the specimen, the temperature of the fixture is lowered to the wetting temperature for gold which is approximately 300 degrees centigrade. Thereafter, the heating element 56 is energized and the gold charge vaporized. The charge weight of the gold is of the order of 600 milligrams and the element current and energizing time are approximately 35 amperes and one minute, respectively. In changing to the new temperature, the thermal contraction of the molybdenum mask is different from that of the stainless steel base plate. In one inch of these metals, the differential of contraction is .0016 inch at temperatures between 300 degrees and 400 degrees centigrade. As a consequence, relative movement occurs between the mask and the specimen. It will be seen from Fig. 4 that the contraction of the specimen 98 and the base plate 74 is toward the center point of the fixture whereas the contraction of the stop 96 and the mask 103 is away from the center point due to the ends thereof being fixed by the pins 80. The change in length of each member of the fixture is given by the well-known formula:

$$\Delta l = l_0(\alpha \Delta T) \quad (1)$$

where $\Delta l$ equals the change in length of the member; $l_0$ equals the initial length of the member at a reference temperature $T_1$; $\alpha$ equals the thermal coefficient of expansion for the member; and, $\Delta T$ is a temperature change with respect to the reference temperature $T_1$.

In the case of the present apparatus for a temperature change of 200 degrees centigrade, the actual relative movement RM between the silicon specimen and the molybdenum mask may be readily shown to be the following after the subtraction of the specimen, stop and mask movement from that of the base plate;

$$RM = l_0\alpha_0\Delta T - (l_1 + l_2)(\alpha_2\Delta T) - l_3\alpha_3\Delta T \quad (2)$$

where $l_0$, $l_1$, $l_2$, and $l_3$ are the lengths of the base plate, stop, mask, and specimen, respectively; $\alpha_1$, $\alpha_2$, and $\alpha_3$ are the thermal expansion coefficients of the base plate, mask, and specimen, respectively; and, ΔT is the temperature change applied to the fixture.

It will be seen that the above-indicated formula permits any spacing between the juxtaposed contact sets to be obtained simply by the proper selection of fixture element dimensions, the temperature change, and the metals employed as contact materials. The geometry of the apertures will also be a factor in the spacing of the contacts.

The collector contacts of the specimen may be vaporized thereon at any convenient time before or after vaporization of the base and emitter contacts. The heating element 52 is energized at a wetting temperature between that for aluminum and gold, the vapor passing through the central opening of the body, the apertures of the base plate and on to the specimen.

Figure 5:
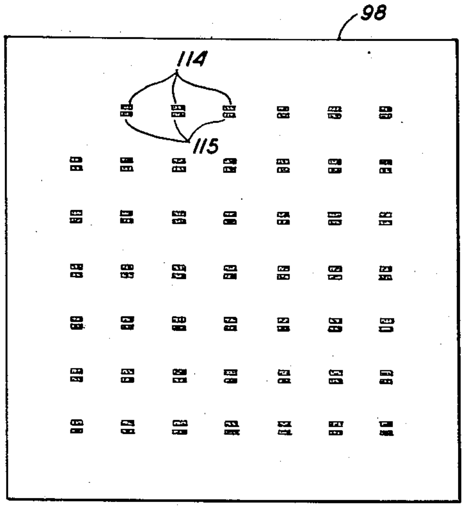
Fig. 5 is a plan view of a semiconductor specimen after vaporization of contacts thereon by the apparatus of Fig. 1.

After all sets of contacts have been deposited on the specimen, the vacuum is broken and the specimen is removed, the appearance of it being shown in Fig. 5. The outline of base and emitter contacts 114 and 115, respectively, are each accurate images of the slots of the mask. The slab then may be diced and the individual units cleaned in suitable solvents.

In summary, it will be seen that the process and apparatus of the present invention enable a plurality of semiconductor devices to be manufactured rapidly since there is no delay on the part of highly skilled operators in positioning the juxtaposed contact sets, the operation of the present invention being entirely automatic. Also, the contacts are placed in one evacuation of the bell jar and are accurately spaced by the precise design of the mask and the calculated dimensional changes of the fixture members. These features are advantageous to mass production of semiconductor devices plus the fact that they contribute to a high uniformity of characteristics between identical devices.

Although the fixture and method have been described for only one specimen, that is, silicon, it may be readily adapted to place a plurality of juxtaposed contacts on other semiconductor material, for example, germanium. Other metals and arrangements may be employed in the fixture to obtain greater or lesser relative movement between the specimen and the mask than that for the molybdenum and stainless steel metals disclosed herein.

It is understood, therefore, that numerous other modifications of the present invention may be made by those skilled in the art without departing from the spirit and the scope of the present invention.

What is claimed is:

1. The method of depositing adjacent spaced contacts of two different contact metals on a semiconductor body comprising positioning a semiconductor body between a base member and an apertured mask member having a temperature coefficient of expansion different from said base member and including a free end fixed to said base member at a point on the opposite side of said semiconductor body from said free end, securing said semiconductor body to said base member, evaporating a first contact metal through the apertures of said mask member at a first ambient temperature and evaporating a second contact metal through the apertures of said mask member at a second ambient temperature, said ambient temperatures being sufficiently different to cause said apertures to move with respect to said base and the semiconductor body, as a result of the difference in coefficient of expansions, a distance greater than the width of said apertures.

2. The method of depositing contacts on a semiconductor device comprising the steps of positioning a semiconductor specimen between an apertured base plate member and an apertured mask assembly of different thermal expansion coefficients, evaporating a first contact metal through the mask apertures and onto the specimen at a first ambient temperature, evaporating a second contact metal through the mask apertures and onto the specimen at a second ambient temperature, said ambient temperatures being sufficiently different to cause said mask apertures to move with respect to said base and the specimen, as a result of the difference in thermal expansion coefficients, a distance greater than the width of said mask apertures, and evaporating a third contact metal through the apertures of the base plate member and onto the specimen at an ambient temperature between the first and second ambient temperatures.

References Cited in the file of this patent

UNITED STATES PATENTS

| | | |
|---|---|---|
| 2,239,770 | Becker et al. | Apr. 29, 1941 |
| 2,286,819 | Lee | June 16, 1942 |
| 2,453,582 | Morgan | Nov. 9, 1948 |
| 2,482,329 | Dimmick | Sept. 20, 1949 |
| 2,634,322 | Law | Apr. 7, 1953 |
| 2,766,144 | Lidow | Oct. 9, 1956 |
| 2,804,405 | Derick et al. | Aug. 27, 1957 |